2,987,353
PISTON AND PISTON RING
James F. Smith, Oklahoma City, Okla., assignor to American Iron & Machine Works Company, Inc., Oklahoma City, Okla., a corporation of Delaware
Filed May 22, 1959, Ser. No. 815,163
3 Claims. (Cl. 309—4)

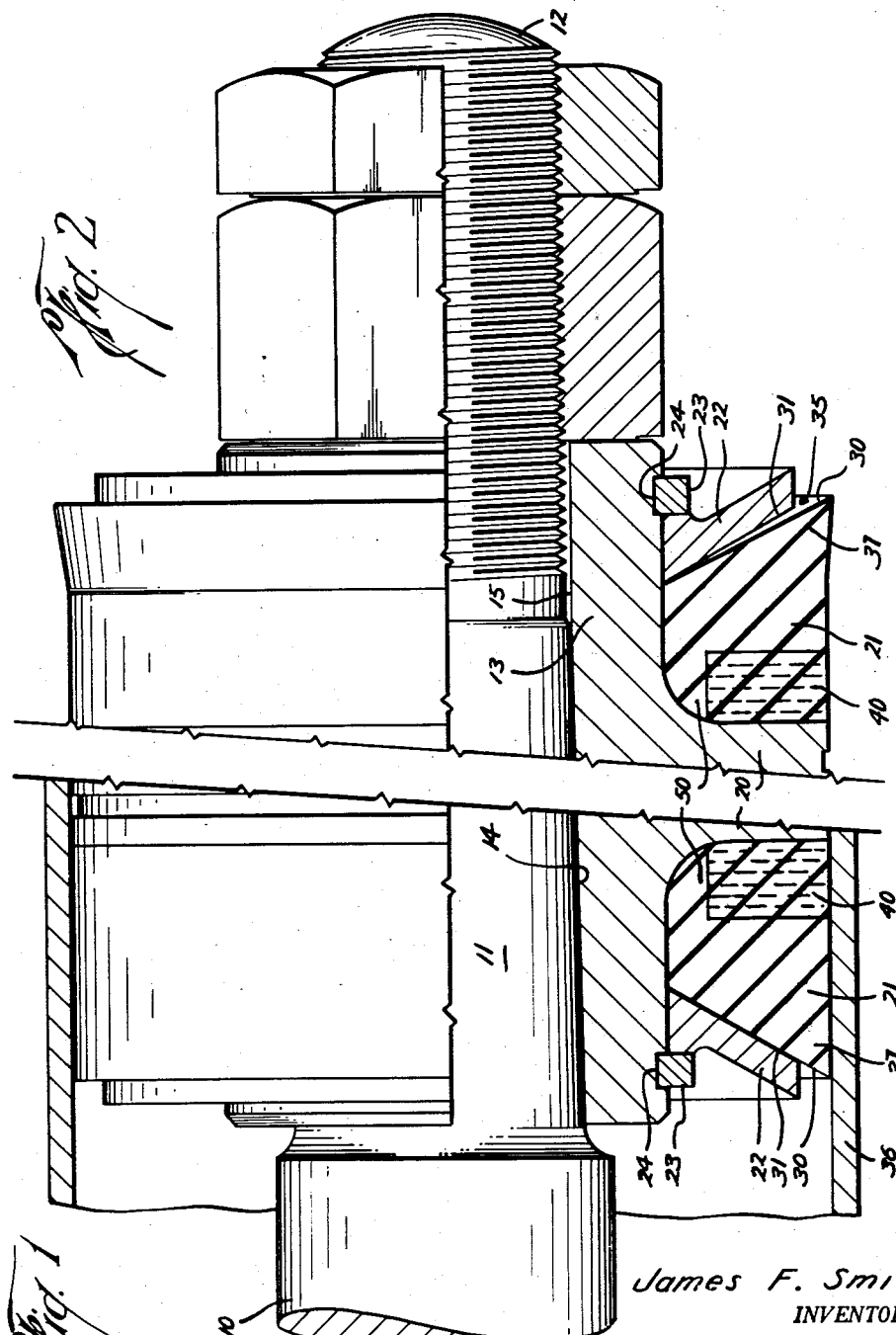

This invention pertains to pistons and piston rings and more particularly to slush pump pistons and replaceable seal rings therefor.

According to the invention a slush pump seal ring made of natural or synthetic rubber compound having a durometer hardness in the range 65 to 95 and preferably 80, and provided with fabric reinforcement in the portion thereof that is adjacent the piston body center flange, is provided with an inner sleeve inside the fabric reinforced back-up portion of the seal ring, extending from the unreinforced portion of the ring.

The principal effect of the invention is the prevention of fluid flow through the fabric of the back-up portion of the seal ring from the inside to the outside thereof. This has several advantages.

First of all, fluid flowing through the back-up portion will deposit its solids in the fabric and cause stress concentration in the seal ring which will break down the fabric to rubber bond after repeated variations of stress as the piston reciprocates in the pump. In the case of sharp particles such as sand there will also be a cutting of the seal ring material with resultant deterioration. Prevention of fluid flow through the back-up portion of the ring avoids these difficulties.

Second, water or other fluid present in the fabric of the back-up portion of the seal ring may flash to vapor during the suction stroke of the pump and the vapor may permeate the seal ring with injurious effects. Prevention of fluid flow through the fabric of the back-up portion of the ring prevents the accumulation of fluid in the fabric.

Third, prevention of flow through the back-up portion of the seal ring increases the pressure differential between the inner and outer diameters of the ring. This expands the back-up portion of the ring until it contacts the pump liner, thereby providing a more complete back-up for the unreinforced portion of the seal ring.

All three of the above enumerated advantages tend to prolong the life and increase the efficiency of the seal ring and the piston with which it is used.

For a detailed description of a preferred embodiment of the invention reference will now be made to the accompanying drawings wherein:

FIGURES 1 and 2 together form a complete half-sectional view of a pump piston embodying the invention mounted on the end of a piston rod, FIGURE 1 showing the piston in position in a pump liner and FIGURE 2 showing the piston removed from the liner.

Referring to the drawings, there is shown a piston rod 10 having a conical tapered portion 11 and a threaded straight portion 12 at its end. Disposed on the piston rod is the core 13 of the piston body, the core having an opening therethrough that is tapered at 14 adjacent the correlatively tapered portion 11 of the piston rod, the opening through the core being cylindrical at 14 adjacent the threaded portion 13 of the piston rod.

The core 13 has a central radial flange or supporting member 20 against which abut the inner end faces of seal rings 21. The seal rings are held in place on the core by end plates 22 which are retained in position by split snap rings 23 resting in annular grooves 24 in the core.

The seal rings have dished outer faces 30 which when relaxed make a steeper acute angle with the core axis than the inner faces 31 of the end plates. When the piston is assembled outside the liner as shown in FIGURE 2, there is a slight axial compression of the seal rings at their central portions, bringing their outer end faces into engagement with the end plates for a distance from the core radially about half way out the end plates, but leaving a space 35 therebetween beyond that point. When the piston is placed in the liner 36, the lips 37 of the seal rings, being of slightly larger diameter than the liner, are flexed inwardly and just fill up spaces 35, as shown in FIGURE 1.

The seal rings are reinforced with layers of fabric at their back-up portions 40 adjacent the center flange 20. These layers of fabric are disposed preferably with their planes perpendicular to the core axis so as to resist excessive radial enlargement of the seal rings and provide a firm back-up for the unreinforced, more flexible portion of the seal rings.

Inwardly toward flange 20 from the unreinforced portion of each seal ring extend sleeves 50. The sleeves extend between the reinforced back-up portions 40 and the core, and being made of rubber compound prevent flow of water radially into the ends of the fabric reinforcing. Although the drawing shows a demarcation line between the reinforced back-up portion of the seal ring and the unreinforced portions including the sleeve 50, it is to be understood that these portions are molded integrally together as one ring, otherwise the sleeve would not seal the fabric ends of the back-up portion and the desired results would not be achieved.

While a preferred embodiment of the invention has been shown and described, many modifications thereof can be made by one skilled in the art without departing from the spirit of the invention and it is desired to cover by Letters Patent all forms of the invention falling within the scope of the following claims.

I claim:
1. A piston comprising a core having a rubber piston ring therearound, said core having a supporting member thereon adjacent said ring, said ring being reinforced with fabric adjacent said supporting member, said ring having a sleeve extending between said core and said reinforced portion of the ring.
2. A rubber piston ring comprising an annular body portion and a fabric reinforced portion adjacent said body portion at one end thereof and a water impervious sleeve extending from said body portion inside the inner periphery of said fabric reinforced portion, said ring being integral.
3. A rubber piston ring comprising an annular body portion and a fabric reinforced portion adjacent said body portion at one end thereof, and a water impervious sleeve extending from said body portion inside the inner periphery of said fabric reinforced portion, said ring being integral, said fabric reinforced portion having layers of canvas duck forming the reinforcement disposed in planes perpendicular to the ring axis, the ring having a durometer hardness in the range 65 to 95 except at said reinforced portion where the durometer hardness is in the range 90 to over 100.

References Cited in the file of this patent
UNITED STATES PATENTS

| | | |
|---|---|---|
| 2,656,229 | Stillwagon | Oct. 20, 1953 |
| 2,677,581 | Taylor | May 4, 1954 |
| 2,926,976 | Bowerman et al. | Mar. 1, 1960 |